United States Patent [19]
Ziu

[11] Patent Number: 5,197,518
[45] Date of Patent: Mar. 30, 1993

[54] CENTERING SUPPORT ASSEMBLY FOR DOUBLE CONTAINMENT PIPE SYSTEMS

[75] Inventor: Christopher G. Ziu, Somerville, Mass.

[73] Assignee: Double Containment Systems, Monroe, Conn.

[21] Appl. No.: 722,083

[22] Filed: Jun. 27, 1991

[51] Int. Cl.⁵ .............................................. F16L 3/10
[52] U.S. Cl. .................... 138/113; 138/108; 138/114; 248/68.1
[58] Field of Search ............... 138/113, 111, 114, 108, 138/148, 105; 248/57, 68.1

[56] References Cited

U.S. PATENT DOCUMENTS

| | | | |
|---|---|---|---|
| 384,948 | 6/1888 | Young | 138/105 |
| 430,010 | 6/1890 | Flad | |
| 666,361 | 1/1901 | Smead | |
| 1,744,102 | 1/1930 | Burke | 138/105 |
| 1,846,550 | 2/1932 | Gottwald | |
| 1,909,075 | 5/1933 | Ricker et al. | |
| 2,181,664 | 11/1939 | Melzer | 138/108 |
| 2,473,264 | 6/1949 | Stevens et al. | 248/68.1 |
| 2,572,955 | 10/1951 | Schumacher | 138/113 |
| 2,603,347 | 7/1952 | Fish | 206/16 |
| 2,664,112 | 12/1953 | Isenberg | 138/113 |
| 2,849,027 | 8/1958 | Tetyak | 138/48 |
| 2,875,987 | 3/1959 | Valley | 257/254 |
| 2,914,090 | 11/1959 | Isenberg | 138/63 |
| 2,963,539 | 12/1960 | Hynes | 248/68.1 |
| 3,065,768 | 11/1962 | Delsa | 138/148 |
| 3,250,297 | 5/1966 | Mooneyham | 138/113 |
| 3,349,168 | 10/1967 | Rehder et al. | 138/113 |
| 3,417,785 | 12/1968 | Andrews | 138/108 |
| 4,642,308 | 2/1972 | Zeile, Jr. et al. | 285/47 |
| 3,765,629 | 10/1973 | Voelker et al. | 248/68 |
| 3,789,129 | 1/1974 | Ditscheld | 174/28 |
| 3,856,244 | 12/1974 | Menshen | 248/68.1 |
| 3,856,246 | 12/1974 | Sinko | 248/68 |
| 3,863,679 | 2/1975 | Young | 138/106 |
| 3,964,754 | 6/1976 | Murai et al. | 277/101 |
| 4,036,617 | 7/1977 | Leonard et al. | 62/55 |
| 4,090,686 | 5/1978 | Yarbrough | 138/105 |
| 4,100,367 | 7/1978 | Netzel | 174/28 |
| 4,122,298 | 10/1978 | Brandt | 174/28 |
| 4,244,544 | 1/1981 | Kornat | 248/68.1 |
| 4,301,838 | 11/1981 | Bignell | 138/112 |
| 4,529,009 | 7/1985 | Horner et al. | 138/111 |
| 4,691,741 | 9/1987 | Affa et al. | 138/113 |
| 4,694,865 | 9/1987 | Tauschmann | 138/148 |
| 4,751,945 | 6/1988 | Williams | 138/117 |
| 4,786,088 | 11/1988 | Ziu | 285/138 |
| 4,804,158 | 2/1989 | Collins et al. | 248/74.4 |
| 4,806,705 | 2/1989 | Chen | 174/135 |
| 4,930,544 | 6/1990 | Ziu | 138/113 |

FOREIGN PATENT DOCUMENTS

| | | | |
|---|---|---|---|
| 0488538 | 1/1918 | France | 138/111 |
| 0703707 | 12/1979 | U.S.S.R. | 138/111 |
| 1085262 | 9/1967 | United Kingdom | 138/113 |

*Primary Examiner*—Philip R. Coe
*Assistant Examiner*—James F. Hook
*Attorney, Agent, or Firm*—Kramer, Brufsky & Cifelli

[57] ABSTRACT

The centering support assembly features a half moon shaped support base with two upright stanchions at opposite sides of the base, providing proper spacing between the base support and a crosshead clamping piece. The entire assembly is bolted together by bolts received through the crosshead and each stanchion, which is threadedly received in the base. One or more inner or primary pipes may be supported between the stanchions, which permit proper deflection of the pipes relative to each other and lateral deflection, if necessary, and similarly, relative to the outer containment pipe. The cross-piece and half moon base portion of the centering support assembly fit within the inner diameter of the outer containment pipe, with the crosshead piece spaced from the inner diameter to permit deflection of the outer pipe relative to the primary pipe or pipes under load.

19 Claims, 1 Drawing Sheet

CENTERING SUPPORT ASSEMBLY FOR DOUBLE CONTAINMENT PIPE SYSTEMS

BACKGROUND OF THE INVENTION

1. Field of the Invention

This invention relates to a device for supporting the inner or primary pipe within an outer containment pipe of a double containment pipe system.

2. Background Information

Hazardous fluids cannot be routinely conveyed in open top drainage channels, but instead in enclosed pipes or conduits. Recognizing that such pipes and conduits can leak because of manufacturing defects, excessive pressure, corrosion or other reasons, the prior art has devised dual containment systems which generally involve the placement of a relatively small fluid carrying closed-wall conduit or pipe within a larger closed-wall conduit or pipe which does not carry fluids except in the event of a leak of liquid carried by the inner conduit. The smaller conduit or pipe is supported by resting directly on the lower, inner wall of the outer conduit or pipe. Alternatively, supports have been proposed wherein the inner pipe may be supported in spaced relation to the lower inner wall of the conduit or pipe. Examples of such supports are illustrated in U.S. Pat. Nos. 4,751,945; 3,863,679; and 3,417,785.

While such supports may be used to space the inner and outer pipes and provide ready access to the inner pipe as spaced locations along the outer pipe, the supports shown in the prior art do not lend themselves to adjustment of the location of the inner or primary pipe relative to the outer or containment pipe.

The support assembly disclosed herein is designed to support a primary pipe within a secondary containment pipe in a double containment piping system, while allowing either pipe to move in specific directions within prescribed limits. This combination of features is useful when used in a specially designed double containment expansion loop, offset or directional change assembly where flexibility at the elbows is required. It is also useful in conjunction with underground double containment piping systems, in order to allow the proper deflection of the secondary containment piping in order to resist burial loads superimposed upon it. Since the majority of double containment piping systems are underground, and those that are aboveground are likely to require expansion assemblies, this has important utility in such systems.

The support can be designed as a series of independent supports, or with the top and bottom portions consisting of continuous profiles, thereby providing continuous support of the primary piping system, and can even accommodate two side-by-side primary pipes.

When the support is designed from continuously extruded top and bottom profiles, the support in effect becomes a support system (as opposed to a series of independent supports) with the modular construction of a supporting system that is capable of supporting multiple primary pipes within a single secondary containment pipe, and the support will allow independent (unrestrained) movement of the primary pipes, thereby allowing for designs involving unevenly expanding/contracting multiple inner pipes.

SUMMARY OF THE INVENTION

In accordance with the present invention, the centering support assembly features a half moon shaped support base with two upright stanchions at opposite sides of the base, providing proper spacing between the base support and a crosshead clamping piece. The entire assembly is bolted together by bolts received through the crosshead and each stanchion, which is threadedly received in the base. One or more inner or primary pipes may be supported between the stanchions, which permit proper deflection of the pipes relative to each other and lateral deflection, if necessary, and similarly, relative to the outer containment pipe. The cross-piece and half moon base portion of the centering support assembly fit within the inner diameter of the outer containment pipe, with the crosshead piece spaced from the inner diameter to permit deflection of the outer pipe relative to the primary pipe or pipes under load.

BRIEF DESCRIPTION OF THE DRAWING

Further objects and advantages of the invention will become more apparent from the following description and claims, and from the accompanying drawing, wherein:

DETAILED DESCRIPTION OF THE PREFERRED EMBODIMENT

Figure 1:
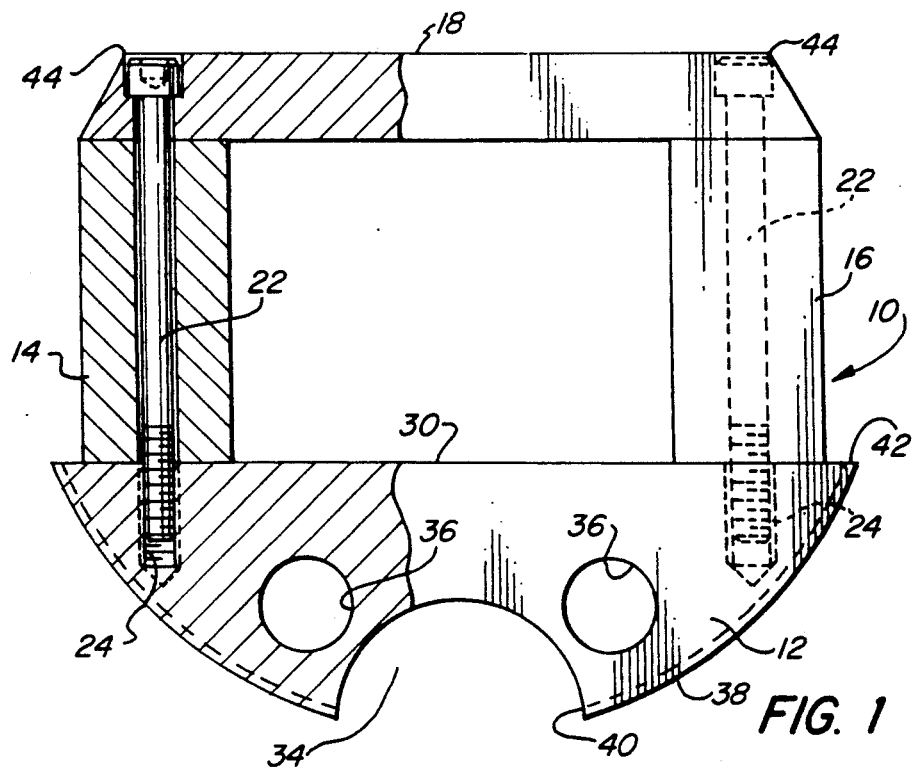
FIG. 1 is a front view in elevation, partly in section, of the centering support assembly of the present invention.

Referring now to the drawing in detail, wherein like numerals indicate like elements throughout the several views, the centering support assembly 10 includes a half moon shaped support base 12 with two upright stanchions 14,16 at opposite sides of the base providing proper spacing between the base support 12 and a crosshead clamping piece 18. The entire assembly 10 is bolted together by bolts 22 received through the crosshead piece 18 and each stanchion 14,16, which is threadedly received in threaded bores 24 in half moon base 12.

One or more inner or primary pipes 26 may be supported between the stanchions 14,16, which permit proper deflection of the pipes relative to each other and lateral deflection, if necessary, and similarly relative to an outer containment pipe 28. The cross-piece 18 and half moon base 12 of the centering support assembly fit within the inner diameter of the outer containment pipe 28 with the crosshead piece 18 spaced from the inner diameter of pipe 28 to permit deflection of the outer pipe relative to the primary pipe 26 or pipes under load. The diameter of the half moon base 12 should conform to the diameter of the outer containment pipe 28 and can be welded to it.

The material of construction of the support assembly 10, including the base 12, stanchions 14 and 16 and crosspiece 18, can be formed from any metallic, reinforced or unreinforced thermosetting plastic or thermoplastic material. The base 12 can be constructed as a series of independent supports, or it can be manufactured as a continuous profile. Similarly, the crosspiece 18 can be constructed as a series of independent supports, or it can be manufactured as a continuous profile.

Figure 2:
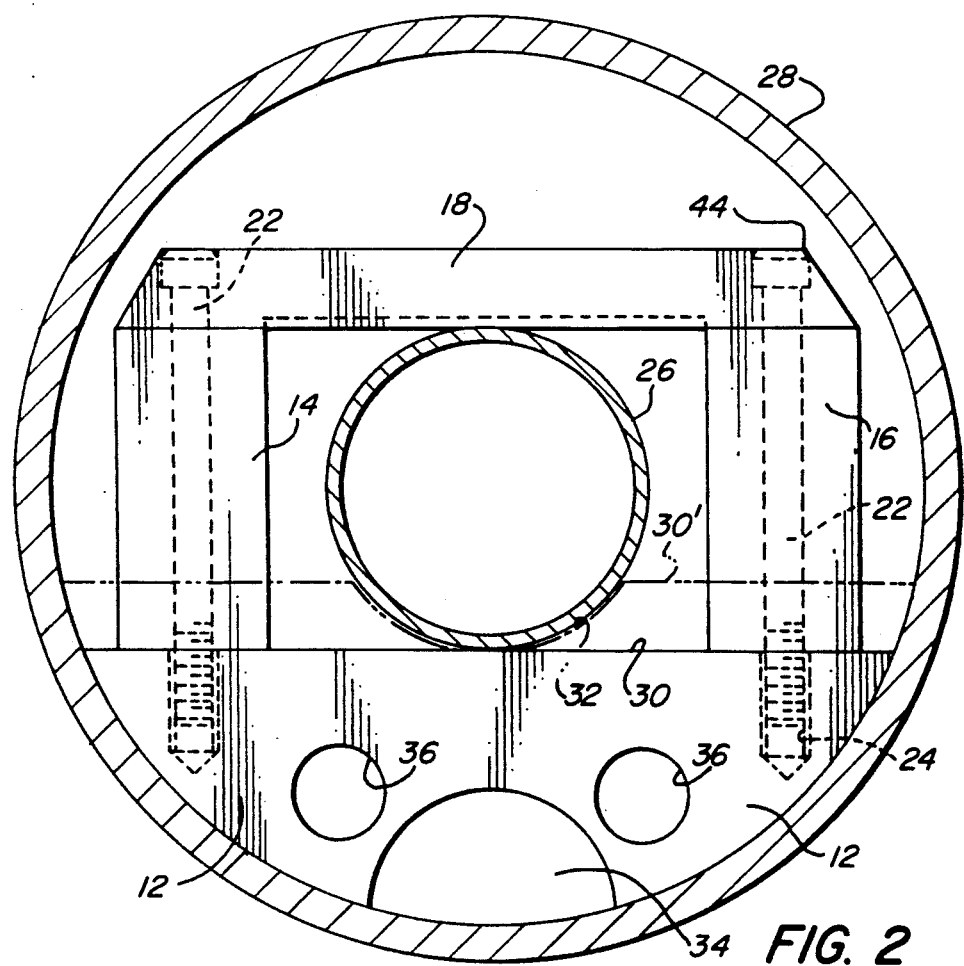
FIG. 2 is a view illustrating the centering support assembly of FIG. 1 mounted in a double containment pipe assembly.

The cross-head clamp 18 is needed in order to prevent buoyant forces from lifting (buckling) the primary piping during testing and flushing operations, or any operation where there is fluid in the annular space. If desired, a slight gap could be provided between the bottom of the cross-head clamp 18 and the 12 o'clock position of the outside diameter of the primary piping system 26, as indicated by the dashed line in FIG. 2. This is important in systems where the primary piping is required to move freely in the longitudinal direction. Alternatively, the top can be designed without any clearance where a tight fit is more desirable. Structurally, the gap can be provided by adjusting the tension between the crosspiece clamp 18 and stanchions 14,16 by unthreading the bolts 22 from wires 24 a slight amount. Tightening the bolts 22, conversely, provides a firmer clamping force.

An alternative design for the top surface 30 of the base 12 is to have the top portion 30' (phantom lines in FIG. 2) of the base 12 contact the primary piping in a seat 32 along a portion of the circumference of the primary piping 26, for up to half of the diameter of the primary piping 26. This allows the bearing load of the primary piping 26 on the support base 12 to be distributed in a more even fashion and lessens the total magnitude of the load at any one point.

A cutout 34 in the base 12 can also be formed to allow fluid in the outer containment pipe to flow through the 6 o'clock position of the annular space. Also, this would allow a space for a leak detection cable to be placed. Optional holes 36 through the cross-section of the support base 12 can be provided that would potentially allow the supports to be connected by some means of pipes or bars. Potentially, a series of supports could be connected with small diameter perforated pipes that could serve as a means of spraying water for flushing purposes in the event of a primary piping leak, and also for distributing clean dry air or nitrogen for drying-/purging purposes. This is an important feature because there is often poor flow capability in an annulus. Having flushing water distributed in a spray and/or vent gas distributed through the perforated pipes would result in a much more efficient means of distribution.

Due to the space between stanchions 14,16, the primary piping 26 may also be positioned within the secondary containment piping 28 in an eccentric fashion. This is important where the diameter of the secondary containment piping must be increased, as in a specially designed expansion section, thereby allowing increased space for movement in a certain direction.

The edge 40 of the opening 34 at the 6 o'clock position of the annulus must be beveled completely across the thickness of the support and on both sides of the opening to preclude point loading of the support. The edge 42 of the top of the base 12 must also be beveled completely across the cross-section of the base, and on both sides. When a continuously extruded profile is used, as opposed to a series of independent supports, this edge may be permanently secured to the secondary containment piping by welding. The outside diameter 38 of the support base 12 is also beveled completely around its circumference, and on both sides. Finally, the edges 44 of the crosspiece clamp 18 must be beveled completely across its cross-section, and on both sides, due to the fact that it represents a potential point of contact with the inside diameter of the secondary containment piping 28 when the secondary containment piping is in its deflected position in an underground application, to avoid point loading and breakage.

What is claimed is:

1. A centering support for a double containment pipe assembly comprising:
   a half moon shaped base support adapted to have seated on one surface thereof at least one inner pipe of a double containment pipe assembly, the opposite surface of said half moon shaped base being arcuate and having a diameter adapted to approximate the inner diameter of an outer containment pipe of said double containment pipe assembly;
   a pair of spaced stanchions mounted on said one surface of said base support on either side of said at least one inner pipe relative to each other, at least one of said stanchions being spaced apart from said at least one inner pipe to permit lateral movement of said inner pipe in at least one direction; and
   a crosspiece clamp supported on the spaced stanchions mounted on said base support to substantially prevent vertical movement of said at least one inner pipe and including means for adjusting the position of said crosspiece clamp relative to said at least one inner pipe for permitting longitudinal movement of said at least one inner pipe on said support base surface between said stanchions.

2. The support of claim 1 including at least one orifice formed in said base opening in the arcuate surface of said base to permit the passage of fluid therethrough which may be disposed in said outer containment pipe.

3. The support of claim 1 wherein said adjusting means includes a bolt disposed between said crosspiece clamp and each stanchion threadedly received in said base.

4. The support of claim 1 wherein the arcuate surface of said half moon base is beveled along at least one edge of the surface.

5. A double containment pipe assembly comprising:
   an outer containment pipe;
   an inner pipe mounted in the interior of said outer pipe;
   a half moon shaped base support having a first surface in seated engagement with said inner pipe and a second arcuate surface coupled to said outer containment pipe along the inner diameter of said outer containment pipe;
   a pair of spaced stanchions mounted on said one surface of said base support on either side of said inner pipe relative to each other, at least one of said stanchions being spaced apart from said at least one inner pipe to permit lateral movement of said inner pipe in at least one direction;
   a crosspiece clamp supported on the spaced stanchions mounted on said base support and defining a space between said crosspiece clamp and said inner pipe for substantially preventing vertical movement of said inner pipe on said support base surface between said stanchions and for permitting longitudinal movement of said inner pipe, the top of said crosspiece clamp being spaced from the inner diameter of said outer containment pipe to permit deflection of said pipe under load.

6. The double containment pipe assembly of claim 5, including means for adjusting the support tension of said crosspiece clamp on said stanchions.

7. The double containment pipe assembly of claim 6 wherein said tension adjusting means includes a bolt disposed between said crosspiece clamp and each stanchion threadedly received in said base.

8. The double containment pipe assembly of claim 5 wherein said crosspiece clamp has sharp corners extending along its surface throughout its length.

9. The double containment pipe assembly of claim 5 including at least one orifice formed in said base opening in the arcuate surface of base to permit the passage of fluid therethrough which may be disposed in said outer containment pipe.

10. The double containment pipe assembly of claim 8 wherein the arcuate surface of said half moon base is beveled along at least one edge of the surface.

11. The support of claim 1 wherein the inner surface of said outer containment pipe is spaced apart from said crosspiece clamp to permit movement of said outer containment pipe and said crosspiece clamp relative to each other.

12. The support of claim 2, wherein said orifice is adapted to receive a pipe for carrying fluid.

13. The support of claim 1, wherein said base support includes a surface shaped to substantially conform to the outer diameter of said at least one inner pipe to support said at least one inner pipe.

14. The support of claim 1, wherein at least one of said base support and said crosspiece clamp defines a continuous profile extending along a substantial portion of said at least one inner pipe.

15. A centering support for a double containment pipe assembly including an inner pipe contained within an outer pipe, comprising:
 a base portion including an arcuate surface defining a curvature substantially matching the curvature of the outer pipe for seating against an inner surface of the outer pipe, and defining a substantially flat support surface on an opposite side of the base portion relative to the arcuate surface for supporting the inner pipe within the outer pipe;
 a pair of stanchion portions, each coupled on one end to the base portion and spaced apart on either side of the inner pipe relative to each other, at least one of the stanchion portions being spaced apart from the inner pipe to permit lateral movement of the inner pipe in at least one direction; and
 a crosspiece portion extending between the other ends of the stanchion portions above the inner pipe and defining a space between the crosspiece portion and the inner pipe to permit longitudinal movement of the inner pipe and substantially prevent vertical movement of the inner pipe.

16. A centering support as defined in claim 15, further comprising means for adjusting the position of the cross-piece portion relative to the inner pipe.

17. A centering support as defined in claim 16, wherein the means for adjusting the position includes at least one threaded member extending through the crosspiece portion and a respective stanchion portion and threadedly engaged within the base member.

18. A centering support as defined in claim 15, wherein the top surface of the crosspiece portion is spaced away from the inside surface of the outer pipe to permit deflection of the outer pipe under load.

19. A centering support as defined in claim 15, wherein the base portion defines at least one of an aperture extending through the base portion and a cutout in the arcuate surface to permit the passage of fluid through the base portion.

* * * * *